(12) United States Patent
Son et al.

(10) Patent No.: US 12,494,556 B2
(45) Date of Patent: Dec. 9, 2025

(54) SECONDARY BATTERY

(71) Applicant: Samsung SDI Co., Ltd., Yongin-si (KR)

(72) Inventors: Hee Myeong Son, Yongin-si (KR); Joon Hong Park, Yongin-si (KR); Jin Hwan Kim, Yongin-si (KR); Kwang Soo Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 581 days.

(21) Appl. No.: 17/931,404

(22) Filed: Sep. 12, 2022

(65) Prior Publication Data

US 2023/0108088 A1    Apr. 6, 2023

(30) Foreign Application Priority Data

Oct. 5, 2021 (KR) .......................... 10-2021-0131596

(51) Int. Cl.
*H01M 50/536* (2021.01)
*H01M 50/105* (2021.01)
*H01M 50/557* (2021.01)

(52) U.S. Cl.
CPC ....... *H01M 50/536* (2021.01); *H01M 50/105* (2021.01); *H01M 50/557* (2021.01)

(58) Field of Classification Search
CPC . H01M 50/536; H01M 50/105; H01M 50/557
USPC ........................................................ 429/184
See application file for complete search history.

(56) References Cited

U.S. PATENT DOCUMENTS

| 2009/0176155 | A1 | 7/2009 | Choi |
| 2010/0173193 | A1 | 7/2010 | Kim |
| 2011/0311859 | A1 | 12/2011 | Park |
| 2018/0026254 | A1 | 1/2018 | Oh et al. |
| 2018/0269457 | A1 | 9/2018 | Kawate et al. |
| 2019/0067665 | A1* | 2/2019 | Jang ................. H01M 50/538 |
| 2019/0097188 | A1* | 3/2019 | Oh .................... H01M 50/55 |

(Continued)

FOREIGN PATENT DOCUMENTS

| EP | 3 680 956 A1 | 7/2020 |
| JP | 5359562 | 12/2013 |

(Continued)

OTHER PUBLICATIONS

Korean Office Action dated Sep. 13, 2023, issued in corresponding Korean Patent Application No. 10-2021-0131596 (5 pages).

(Continued)

*Primary Examiner* — James M Erwin
(74) *Attorney, Agent, or Firm* — Womble Bond Dickinson (US) LLP (57) ABSTRACT

A secondary battery includes: an electrode assembly including a first electrode substrate tab and a second electrode substrate tab; a case accommodating the electrode assembly; strip terminals electrically connected to the first electrode substrate tab and the second electrode substrate tab, respectively, and extending to an outside of the case; and conductive adhesive members around connection portions between the first electrode substrate tab and a strip terminal of the strip terminals and the second electrode substrate tab and another strip terminal of the strip terminals, respectively.

11 Claims, 5 Drawing Sheets

(56) References Cited

U.S. PATENT DOCUMENTS

2020/0212405 A1\* 7/2020 Wong .................. H01M 50/184
2021/0074987 A1 3/2021 Kim

FOREIGN PATENT DOCUMENTS

| KR | 10-2006-0033642 A | 4/2006 |
| KR | 10-2009-0064089 | 6/2009 |
| KR | 10-1122811 | 3/2012 |
| KR | 10-2016-0034956 A | 3/2016 |
| KR | 10-2016-0049889 A | 5/2016 |
| KR | 10-2016-0118582 | 10/2016 |
| KR | 10-2017-0100333 | 9/2017 |
| KR | 10-2019-0112429 | 10/2019 |

OTHER PUBLICATIONS

Extended European Search Report dated Feb. 22, 2023, issued in corresponding European Patent Application No. 22199189.6 (8 pages).
Chinese Office Action dated Sep. 16, 2025 issued in corresponding Chinese Patent Application No. 202211209786.9 (9 pages).

\* cited by examiner

SECONDARY BATTERY

CROSS-REFERENCE TO RELATED APPLICATION

This application claims priority to and the benefit of Korean Patent Application No. 10-2021-0131596, filed on Oct. 5, 2021 in the Korean Intellectual Property Office, the entire content of which is herein incorporated by reference.

BACKGROUND

1. Field

Aspects of embodiments of the present disclosure relate to a secondary battery.

2. Description of the Related Art

A secondary battery includes an electrode assembly including a positive electrode, a negative electrode, and a separator interposed between the positive electrode and the negative electrode, and a cell including an electrolyte solution impregnated in the electrode assembly.

Secondary batteries can be classified into cylindrical, prismatic, and pouch types depending on the appearance and the shape of the case. Among them, the pouch-type secondary battery is constructed by winding or stacking an electrode assembly and sealing the same by accommodating the electrode assembly together with an electrolyte in a pouch-shaped case. After overlapping and welding a strip-shaped lead terminal on the substrate tab of the electrode assembly, an insulating tape is attached and bent, and a part of the lead terminal is exposed to the outside of the case.

The above-described pouch-type secondary battery requires an extra accommodating space because the substrate tab and the lead terminal are overlapped and welded to be bent and accommodated inside the pouch. Accordingly, the battery capacity cannot be increased and a degree of space utilization rate inside the battery may be lowered, which are problematic.

The above information disclosed in this Background section is provided for enhancement of understanding of the background of the invention and, therefore, it may contain information that does not constitute prior art.

SUMMARY

According to an aspect of embodiments of the present disclosure, a secondary battery having an improved degree of space utilization inside the battery is provided.

A secondary battery according to one or more embodiments of the present disclosure may include: an electrode assembly including a first electrode substrate tab and a second electrode substrate tab; a case accommodating the electrode assembly; strip terminals electrically connected to the first electrode substrate tab and the second electrode substrate tab, respectively, and extending to an outside of the case; and conductive adhesive members around connection portions between the first electrode substrate tab and a strip terminal of the strip terminals and the second electrode substrate tab and another strip terminal of the strip terminals, respectively.

Bonding surfaces of ends of the first and second electrode substrate tabs and end portions of the strip terminals may be butt-aligned with respect to each other.

The conductive adhesive members may be attached to the butt-aligned bonding surfaces in a non-welded state.

The conductive adhesive members may be attached to the butt-aligned bonding surfaces in a welded state.

A conductive adhesive member of the conductive adhesive members may include a base film layer having an insulating property and a conductive adhesive layer having conductivity.

The conductive adhesive layer may include conductive powder and a rubber-based adhesive.

The conductive adhesive layer may include a conductive mesh structure and a rubber-based adhesive.

The conductive adhesive layer may include an anisotropic conductive film (ACF).

An area of the base film layer may be greater than an area of the conductive adhesive layer.

The case may be any of a pouch type, a cylindrical type, and a prismatic type.

DETAILED DESCRIPTION

One or more example embodiments of the present disclosure are provided herein to more completely explain the present disclosure to those skilled in the art, and the following examples may be modified in various other forms. The present disclosure, however, may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It is to be further understood that the terms "comprise" or "include" and/or "comprising" or "including" when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a secondary battery according to one or more embodiments of the present disclosure will be described in further detail with reference to the accompanying drawings.

Figure 1:
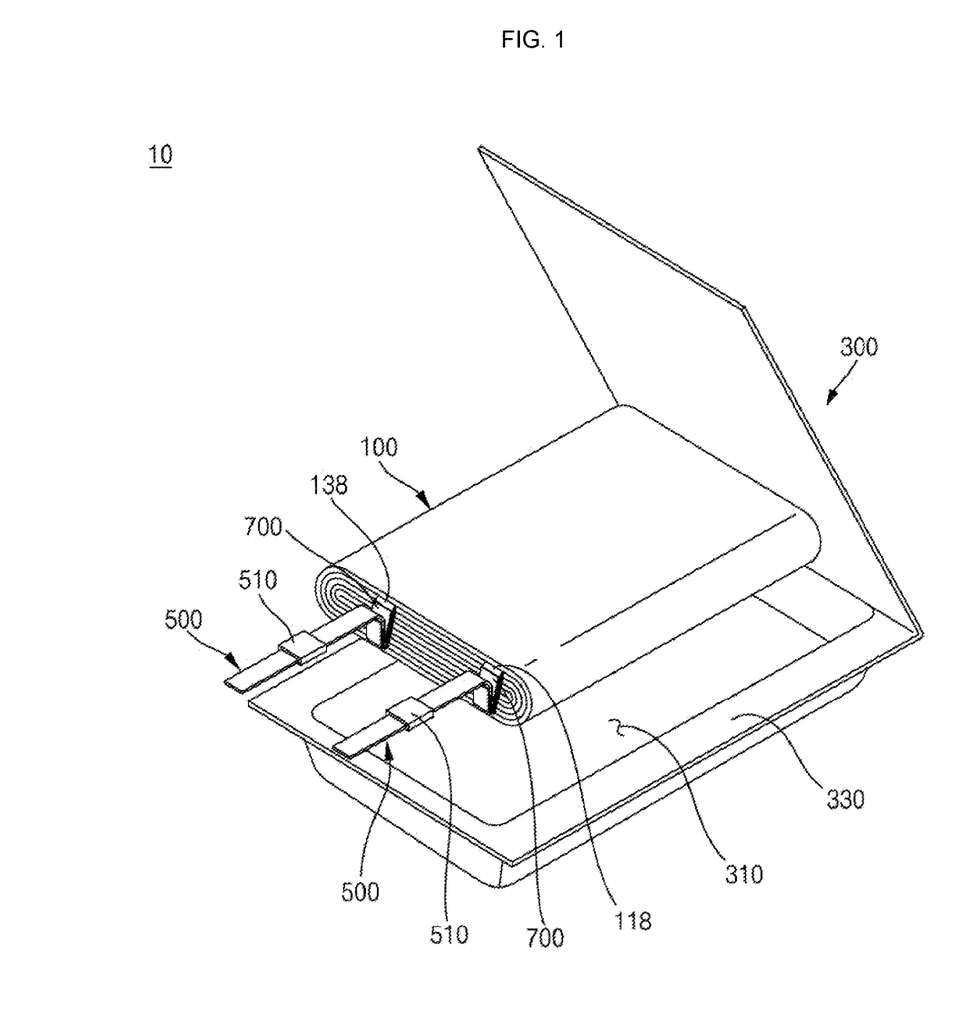
FIG. 1 is a perspective view of a secondary battery according to an embodiment of the present disclosure.
Figure 2:
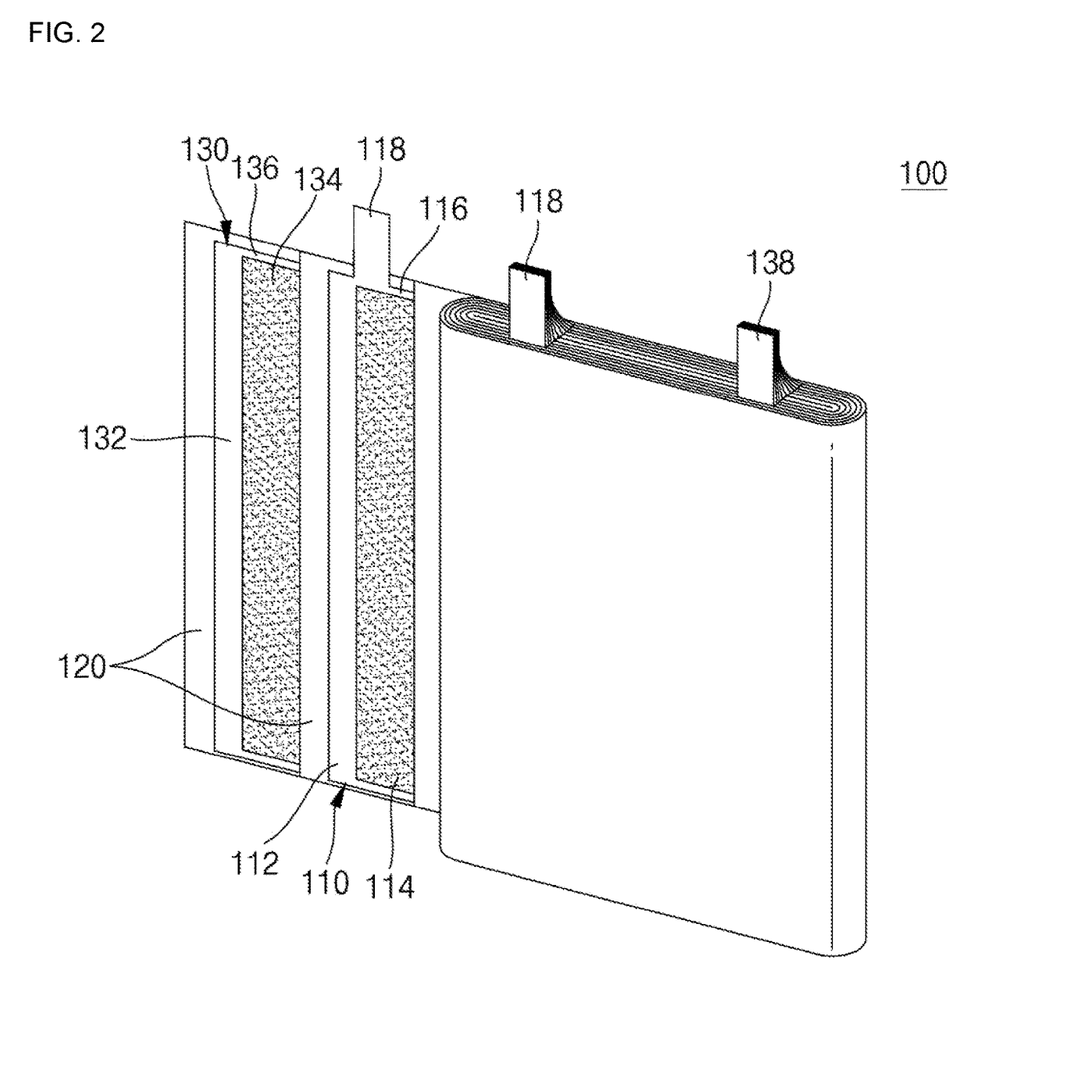
FIG. 2 is a view of an electrode assembly of the secondary battery of FIG. 1.
Figure 3:
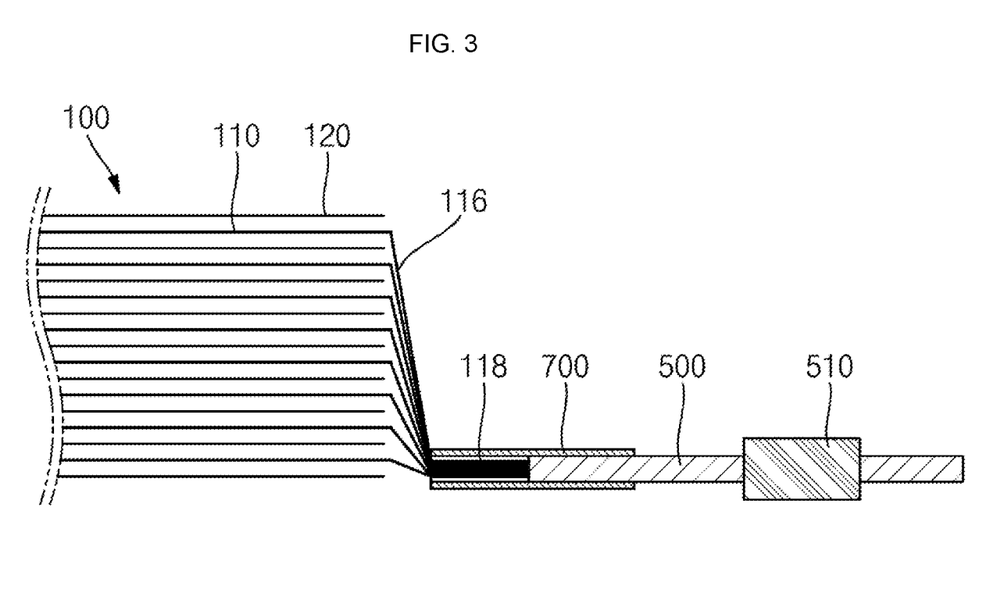
FIG. 3 is an enlarged partial cross-sectional view showing a portion of the electrode assembly of FIG. 2.

FIG. 1 is a perspective view of a secondary battery according to an embodiment of the present disclosure; FIG. 2 is a view of an electrode assembly of the secondary battery of FIG. 1; and FIG. 3 is an enlarged partial cross-sectional view showing a portion of the electrode assembly of FIG. 2.

As shown in FIGS. 1 and 2, a secondary battery 10 according to an embodiment of the present disclosure may include an electrode assembly 100, a case 300 accommodating the electrode assembly 100, and a strip terminal 500 for electrically connecting the electrode assembly 100 to an outside of the secondary battery 10.

The electrode assembly 100 may include a first electrode plate 110 and a second electrode plate 130, which may be formed in a thin or film shape, and a separator 120 that insulates the first electrode plate 110 and the second electrode plate 130 from each other. Here, the first electrode plate 110 may be a negative electrode, and the second electrode plate 130 may be a positive electrode, or vice versa. Each of the first electrode plate 110 and the second electrode plate 130 may include a substrate tab, and the electrode assembly 100 is connected to the outside of the secondary battery 10 by electrically connecting the substrate tab and the strip terminal 500. The electrode assembly 100 may be commonly referred to as a jelly roll. In the present disclosure, an example in which the electrode assembly 100 is wound is described, but embodiments are not limited thereto.

In an embodiment, the first electrode plate 110, which is a negative electrode, may be formed by coating a first electrode active material 114, such as graphite or carbon, on a first electrode current collector 112 formed of a metal foil, such as copper, a copper alloy, nickel, or a nickel alloy. A first electrode uncoated region 116 to which the first electrode active material 114 is not applied may be formed in a partial region of the first electrode current collector 112. A plurality of first electrode substrate tabs 118 may be formed on the first electrode uncoated region 116. For example, the first electrode substrate tab 118 may be formed by pressing the first electrode uncoated region 116 with a press to have a certain shape. As an example, the first electrode substrate tab 118 may have a rectangular shape. The first electrode substrate tab 118 may extend to an outside of the first electrode current collector 112 (e.g., extending upward on the basis of FIG. 2). In addition, the first electrode substrate tab 118 may be formed so as not to overlap a second electrode substrate tab 138. For example, all of the substrate tabs disposed on the left side of the electrode assembly 100 in FIG. 2 may be the first electrode substrate tabs 118. The first electrode substrate tabs 118 may be disposed to be spaced apart from the second electrode substrate tabs 138. The first electrode substrate tab 118 serves as a passage for current flow between the first electrode plate 110 and the strip terminal 500.

The separator 120, which is interposed between the first electrode plate 110 and the second electrode plate 130, prevents or substantially prevents a short circuit between the first electrode plate 110 and the second electrode plate 130 and enables movement of lithium ions. To this end, the separator 120 may be formed to be larger than the first electrode plate 110 and the second electrode plate 130. The separator 120 may be made of polyethylene, polypropylene, or a composite film of polyethylene and polypropylene, but is not limited thereto.

In an embodiment, the second electrode plate 130, which is a positive electrode, may be formed by coating a second electrode active material 134, such as a transition metal oxide, on a second electrode current collector 132 formed of a metal foil, such as aluminum or an aluminum alloy. A second electrode uncoated region 136 to which the second electrode active material 134 is not applied may be formed in a partial region of the second electrode current collector 132. A plurality of second electrode substrate tabs 138 may be formed on the second electrode uncoated region 136. For example, the second electrode substrate tab 138 may be formed by pressing the second electrode uncoated region 136 with a press to have a certain shape. As an example, the second electrode substrate tab 138 may have a rectangular shape. The second electrode substrate tab 138 may extend to an outside of the second electrode current collector 132 (e.g., extending upward on the basis of FIG. 2). In addition, the second electrode substrate tab 138 may be formed so as not to overlap with the first electrode substrate tab 118. For example, all of the substrate tabs disposed on the right side of the electrode assembly 100 in FIG. 2 may be the second electrode substrate tabs 138. The second electrode substrate tabs 138 may be disposed to be spaced apart from the first electrode substrate tabs 118. The second electrode substrate tab 138 serves as a passage for current flow between the second electrode plate 130 and the strip terminal 500.

As shown in FIG. 3, the strip terminals 500 function to electrically connect the outside of the secondary battery 10 and the substrate tabs 118 and 138. The strip terminals 500 may be provided as a pair to be electrically connected to the first electrode substrate tab 118 and the second electrode substrate tab 138, respectively. Here, the first electrode substrate tab 118 and the second electrode substrate tab 138 may be electrically connected to the strip terminals 500 after being collected in the same or different directions, respectively. In an embodiment, the strip terminals 500 may be in the form of a thin film or a film, and may include an insulating part 510 to insulate the same from the case 300. The insulating part 510 may be formed in a region in contact with the case 300. In an embodiment, the strip terminals 500 may be formed to have a same width as the substrate tabs 118 and 138 (see FIG. 1), but are not limited thereto. For example, the strip terminals 500 and the first electrode substrate tab 118 and the second electrode substrate tab 138 may be electrically connected by an adhesive member 700 (which will be described later).

The electrode assembly 100 having the above-described structure is accommodated in the case 300 together with an electrolyte.

As shown in FIG. 1, the case 300 may include an accommodating space in which the electrode assembly 100 can be accommodated.

The case 300 may be referred to as a laminate exterior material, a pouch, a pouch exterior material, a pouch case, or the like. After bending the plate-shaped exterior material to face bent portions of each other, the case 300 may form a recess 310 by pressing or drawing a surface thereof. The electrode assembly 100 is accommodated in the recess 310. A sealing part 330 is formed at an outer periphery of the recess 310, and the sealing part 330 may be sealed by thermal fusion, etc. in a state in which the electrode assembly 100 is accommodated in the recess 310. In the present disclosure, the pouch-type secondary battery 10 has been described by way of example, but a terminal connection structure to be described later may also be applied to a cylindrical or prismatic-type secondary battery.

Herein, a connection structure between the substrate tab and the strip terminal will be described in further detail. For convenience, the side surface of the substrate tab side of the first electrode will be illustrated and described, but the same structure may also be applied to the second substrate tab.

Figure 4:
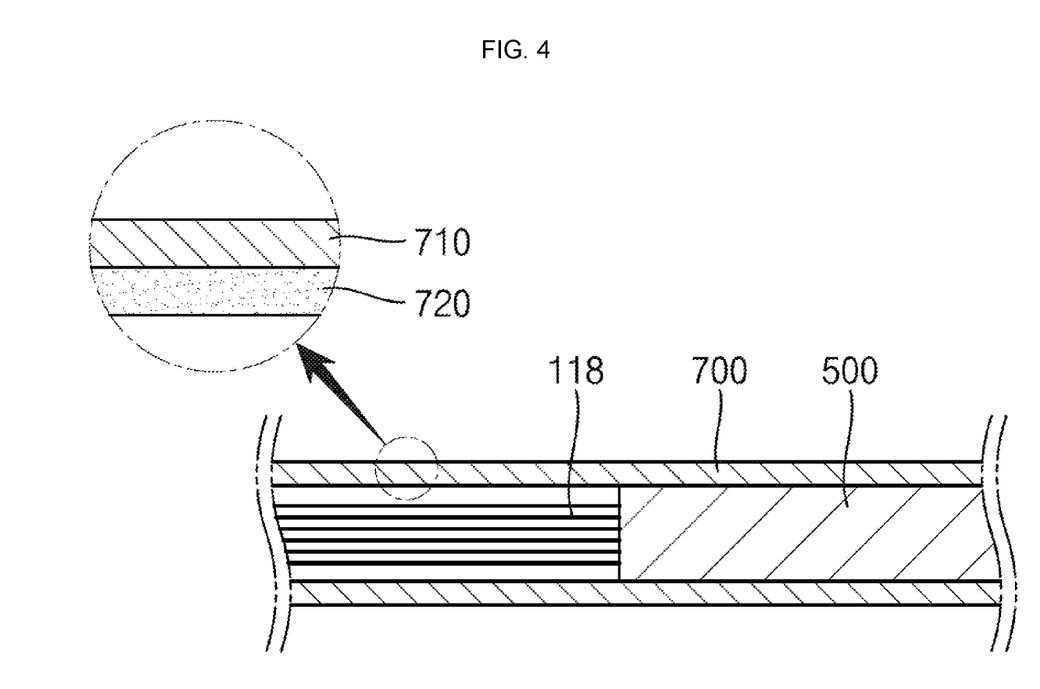
FIG. 4 is an enlarged partial cross-sectional view of a connection portion of a substrate tab and a strip terminal shown in FIG. 3.
Figure 5:
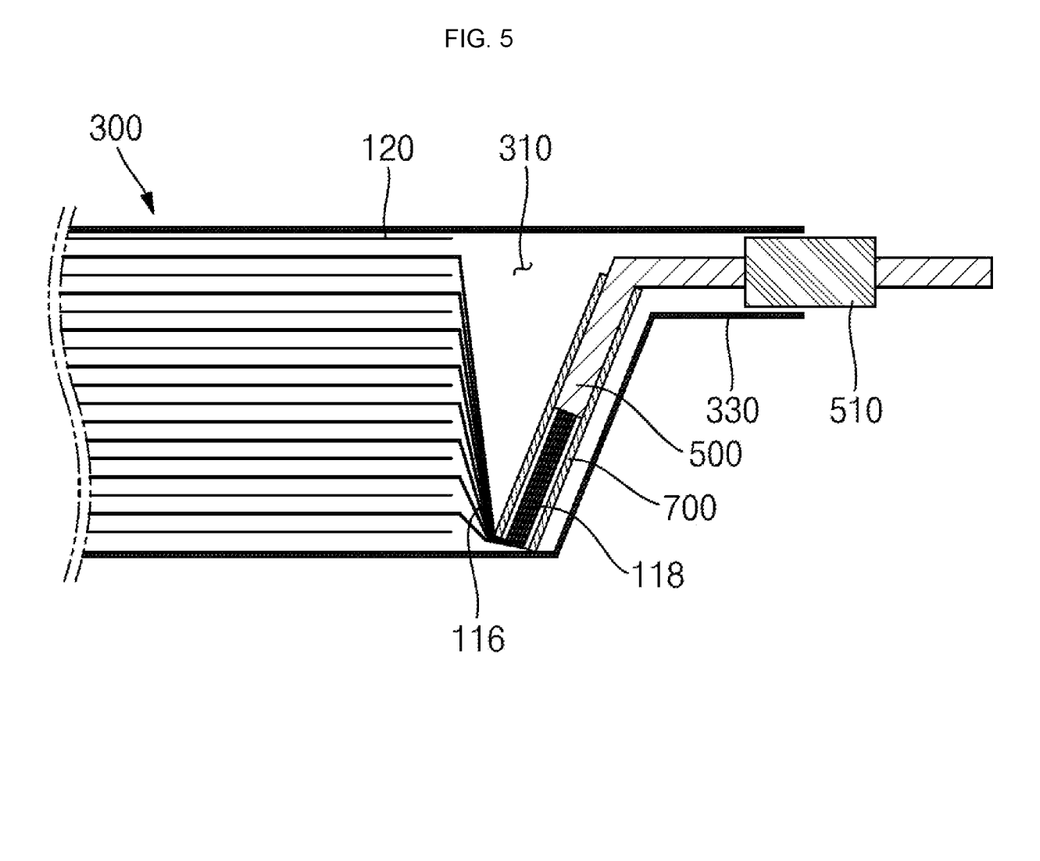
FIG. 5 is an enlarged partial cross-sectional view showing a state in which the electrode assembly of FIG. 3 is accommodated in a case.

FIG. 4 is an enlarged partial cross-sectional view of a connection portion of a substrate tab and a strip terminal shown in FIG. 3; and FIG. 5 is an enlarged partial cross-sectional view showing a state in which the electrode assembly of FIG. 3 is accommodated in a case.

After the first electrode substrate tabs 118 are collected and welded in a direction of the electrode assembly 100 as shown in FIG. 2, the ends thereof may be aligned so as to contact the end of the strip terminal 500 as shown in FIGS. 4 and 5. After butt-aligning the ends of the first electrode substrate tab 118 and the strip terminal 500, the adhesive member (e.g., conductive adhesive member) 700 is attached to electrically connect the first electrode substrate tab 118 and the strip terminal 500 to each other. In an embodiment, the adhesive member 700 may be attached to the bonding surface of the butt-aligned first electrode substrate tab 118 and the end of the strip terminal 500 in a non-welded state. In another embodiment, the adhesive member 700 may be attached in a state in which the bonding surface of the butt-aligned first electrode substrate tab 118 and the end of the strip terminal 500 are welded.

As shown in FIG. 4, in an embodiment, the adhesive member 700 may include a base film layer 710 as an outer layer and a conductive adhesive layer 720 as an inner layer. The base film layer 710 is a layer disposed toward an outside of the connection portion between the first electrode substrate tab 118 and the strip terminal 500. The base film layer 710 may be made of an insulating material, such as polyimide (PI) or polyethylene terephthalate (PET). For example, the base film layer 710 may have a larger area than the conductive adhesive layer 720.

The conductive adhesive layer 720 is a layer in contact with the first electrode substrate tab 118 and the strip terminal 500, and may be made of an adhesive material having conductivity. In an embodiment, the conductive adhesive layer 720 may be made by mixing conductive powder with an adhesive, or may be formed such that a conductive material forms a mesh structure, etc. inside the adhesive layer. In an embodiment, the adhesive component of the conductive adhesive layer 720 may be, for example, a rubber-based adhesive. In another embodiment, the conductive adhesive layer 720 may include an anisotropic conductive film (ACF).

As shown in FIG. 4, the adhesive member 700 may be attached such that the conductive adhesive layer 720 comes in contact with upper and lower surfaces of a connection portion between the first electrode base tab 118 and the strip terminal 500. Since the first electrode substrate tab 118 and the strip terminal 500 are electrically connected to each other by the conductive adhesive layer 720, the first electrode substrate tab 118 and the strip terminal 500 may be electrically connected without overlapping and welding. Therefore, compared to a conventional structure in which a first electrode substrate tab and a strip terminal are overlapped and welded and a cover tape is then attached, a thickness of the connection portion between the first electrode substrate tab 118 and the strip terminal 500 according to the present disclosure can be greatly reduced.

After connecting the first electrode substrate tab 118 and the strip terminal 500 with the adhesive member 700, the first electrode substrate tab 118 may be bent to be accommodated in the recess 310 of the case 300, followed by sealing the case 300.

According to an embodiment of the present invention, since the thickness of the connection portion between the first electrode substrate tab 118 and the strip terminal 500 is reduced, compared to a conventional structure, a space occupied inside the case 300, after bending the first electrode substrate tab 118, may also be reduced. Accordingly, the capacity of the electrode assembly 100 may be increased by the space secured by the thickness reduction, and the size of the case 300 may be reduced.

As described above, according to one or more embodiments, the thickness of the connection portion between the substrate tab and the strip terminal may be reduced, such that a space occupied by the connection portion inside the battery case after bending can be reduced, and, thus, a degree of space utilization inside the battery is improved. In addition, as the thickness of the connection portion is reduced, the battery capacity may be increased.

While one or more embodiments have been described herein, the present disclosure is not limited thereto, and it will be understood by a person skilled in the art that various changes in form and details may be made therein without departing from the spirit and scope of the present disclosure as set forth in the following claims.

What is claimed is:

1. A secondary battery comprising:
    an electrode assembly comprising a first electrode substrate tab and a second electrode substrate tab;
    a case accommodating the electrode assembly;

strip terminals electrically connected to the first electrode substrate tab and the second electrode substrate tab, respectively, and extending to an outside of the case; and conductive adhesive members around connection portions between the first electrode substrate tab and a strip terminal of the strip terminals and the second electrode substrate tab and another strip terminal of the strip terminals, respectively, wherein the conductive adhesive members comprise an adhesive material having conductivity and are attached to bonding surfaces of ends of the first and second electrode substrate tabs and end portions of the strip terminals.

2. The secondary battery of claim 1, wherein the bonding surfaces of the ends of the first and second electrode substrate tabs and the end portions of the strip terminals are butt-aligned with respect to each other.

3. The secondary battery of claim 2, wherein the conductive adhesive members are attached to the butt-aligned bonding surfaces in a non-welded state.

4. A secondary battery comprising:
an electrode assembly comprising a first electrode substrate tab and a second electrode substrate tab;
a case accommodating the electrode assembly;
strip terminals electrically connected to the first electrode substrate tab and the second electrode substrate tab, respectively, and extending to an outside of the case; and
conductive adhesive members around connection portions between the first electrode substrate tab and a strip terminal of the strip terminals and the second electrode substrate tab and another strip terminal of the strip terminals, respectively,
wherein bonding surfaces of ends of the first and second electrode substrate tabs and end portions of the strip terminals are butt-aligned with respect to each other, and
wherein the conductive adhesive members are attached to the butt-aligned bonding surfaces in a welded state.

5. The secondary battery of claim 1, wherein a conductive adhesive member of the conductive adhesive members comprises a base film layer having an insulating property and a conductive adhesive layer having conductivity.

6. The secondary battery of claim 5, wherein the conductive adhesive layer comprises conductive powder and a rubber-based adhesive.

7. The secondary battery of claim 5, wherein the conductive adhesive layer comprises a conductive mesh structure and a rubber-based adhesive.

8. The secondary battery of claim 5, wherein the conductive adhesive layer comprises an anisotropic conductive film.

9. A secondary battery comprising:
an electrode assembly comprising a first electrode substrate tab and a second electrode substrate tab;
a case accommodating the electrode assembly;
strip terminals electrically connected to the first electrode substrate tab and the second electrode substrate tab, respectively, and extending to an outside of the case; and
conductive adhesive members around connection portions between the first electrode substrate tab and a strip terminal of the strip terminals and the second electrode substrate tab and another strip terminal of the strip terminals, respectively,
wherein a conductive adhesive member of the conductive adhesive members comprises a base film layer having an insulating property and a conductive adhesive layer having conductivity, and
wherein an area of the base film layer is greater than an area of the conductive adhesive layer.

10. The secondary battery of claim 1, wherein the case is any of a pouch type, a cylindrical type, and a prismatic type.

11. The secondary battery of claim 5, wherein the base film layer is an outer layer, and the conductive adhesive layer is an inner layer located between the base film layer and a connection portion of the connection portions.

* * * * *